United States Patent
Breau et al.

(10) Patent No.: US 8,526,360 B1
(45) Date of Patent: Sep. 3, 2013

(54) REVERSE BUFFERING A STREAM OF MEDIA CONTENT

(75) Inventors: Jeremy R. Breau, Kansas City, MO (US); Pallavur Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 264 days.

(21) Appl. No.: 12/171,467

(22) Filed: Jul. 11, 2008

(51) Int. Cl.
*H04W 4/00* (2009.01)

(52) U.S. Cl.
USPC ............................. 370/328; 709/219; 709/231

(58) Field of Classification Search
None
See application file for complete search history.

(56) References Cited

U.S. PATENT DOCUMENTS

| | | | | |
|---|---|---|---|---|
| 2002/0059120 | A1* | 5/2002 | Milton | 705/28 |
| 2002/0161911 | A1* | 10/2002 | Pinckney et al. | 709/231 |
| 2004/0068532 | A1* | 4/2004 | Dewing et al. | 709/200 |
| 2004/0132467 | A1* | 7/2004 | Hull et al. | 455/458 |
| 2006/0126556 | A1* | 6/2006 | Jiang et al. | 370/328 |
| 2006/0230170 | A1* | 10/2006 | Chintala et al. | 709/231 |
| 2008/0080685 | A1* | 4/2008 | Barnes et al. | 379/112.05 |

OTHER PUBLICATIONS

Office Action mailed in U.S. Appl. No. 12/171,469 on Dec. 22, 2010.

* cited by examiner

*Primary Examiner* — Jason Mattis
*Assistant Examiner* — James P Duffy

(57) ABSTRACT

A method, system, and medium are provided for optimizing a stream of a media content through a wireless telecommunications network. A catalog receives a request from a mobile communication device for a particular media content. The catalog identifies that the media content is not available as reverse buffered media content. The request is then directed to a host of the media content where the host communicates the media to the mobile communications device. The media content is reverse buffered at a reverse buffer. The catalog updates to indicate that the media content is available as reverse buffered media content at the reverse buffer. The catalog receives a second request for the media content. The catalog determines that the media content is available and directs the request to the reverse buffer. The reverse buffered media content is communicated to the second mobile communication device.

18 Claims, 9 Drawing Sheets

REVERSE BUFFERING A STREAM OF MEDIA CONTENT

CROSS-REFERENCE TO RELATED APPLICATIONS

Applicants wish to call the Office's attention to the fact that the two following applications (one of which is this one), filed on even date herewith, include related disclosed subject matter: 1) REVERSE BUFFERING A STREAM OF MEDIA CONTENT given U.S. application Ser. No. 12/171,467 and 2) REVERSE BUFFERING MEDIA CONTENT AT A MOBILE COMMUNICATION DEVICE given U.S. application Ser. No. 12/171,469. The subject matter of each of these documents is expressly incorporated by reference herein.

BACKGROUND

Streaming media content, such as audiovisual streams, are presented on mobile communication devices. Typically, a user of a mobile communication device requests a media content that is then streamed to the mobile communication device for presentation to the requesting user. When a user requests a particular media content, a request is communicated from the mobile communication device to a known host of the media content. The host of the media content then streams the requested media content across a network to the wireless network that communicates the media content to the requesting mobile communication device. Some of the resources utilized to communicate the media content from the host to the mobile communication device are less economical to utilize than other resources. For example, network resources, such as bandwidth, that are paid for by the unit of use increase the cost of communicating the requested media content if those resources are utilized to communicate the media content. In order to obtain efficiencies, it is beneficial to reduce the utilization of those resources that are less efficient to utilize.

SUMMARY

Embodiments of the present invention relate to methods and computer storage media for optimizing the communication of a media content stream through a wireless telecommunications network. A catalog that maintains a registry of reverse buffered media content is queried to determine if the requested media content is available as reverse buffered media content. When the content is determined not to be available as reverse buffered media content, the request is directed to the host of the requested media content. The host then streams the media content to the requesting mobile communication device. The media content is reverse buffered at a reverse buffer so that the media content is accessible as reverse buffered media content to other requesting devices. The catalog is updated to indicate that the media content is reverse buffered at the reverse buffer. The catalog receives a second request from a second mobile communication device for the media content. The catalog determines that the media content is available at the reverse buffer and the catalog redirects the request to the reverse buffer to facilitate the streaming of the reverse buffered media content to the second mobile communication device. In an exemplary embodiment, the reverse buffer is associated with a component of the wireless network, such as a transceiver. In an additional exemplary embodiment, the reverse buffer is associated with the mobile communication device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
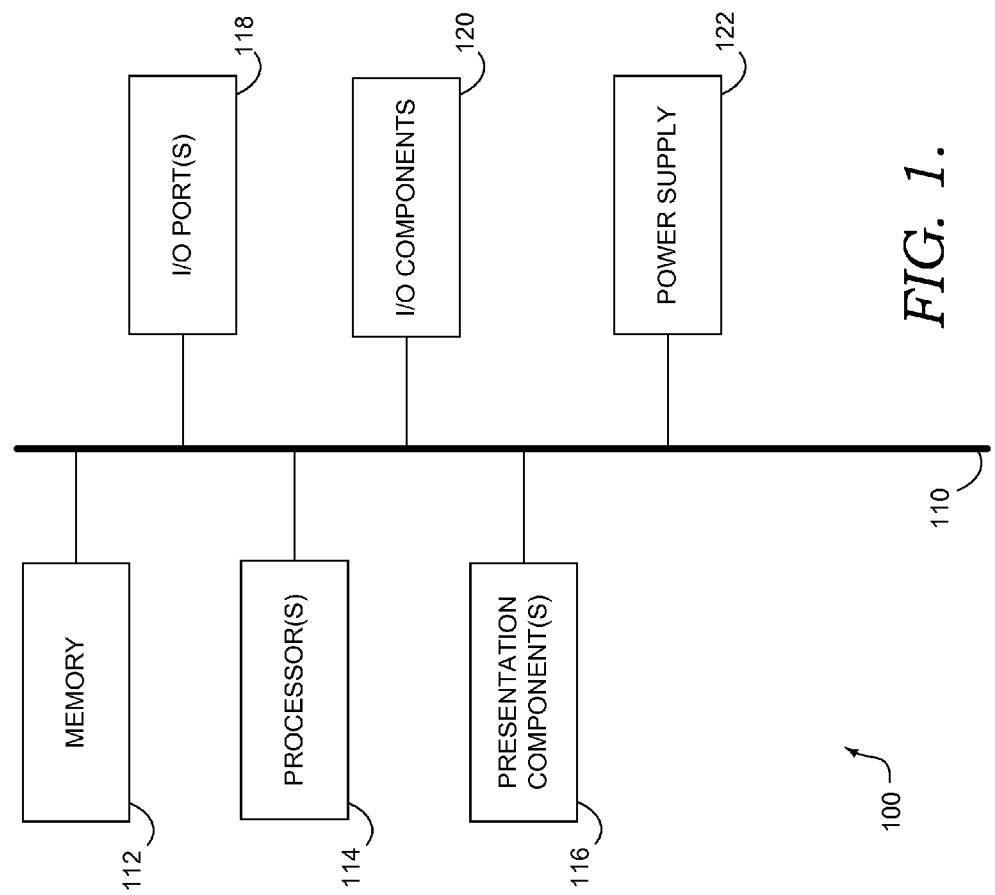
FIG. 1 depicts an exemplary operating environment suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods and computer storage media for optimizing the communication of a media content stream through a wireless telecommunications network. A catalog that maintains a registry of reverse buffered media content is queried to determine if the requested media content is available as reverse buffered media content. When the content is determined not to be available as reverse buffered media content, the request is directed to the host of the requested media content. The host then streams the media content to the requesting mobile communication device. The media content is reverse buffered at a reverse buffer so that the media content is accessible as reverse buffered media content to other requesting devices. The catalog is updated to indicate that the media content is reverse buffered at the reverse buffer. The catalog receives a second request from a second mobile communication device for the media content. The catalog determines that the media content is available at the reverse buffer and the catalog redirects the request to the reverse buffer to facilitate the streaming of the reverse buffered media content to the second mobile communication device. In an exemplary embodiment, the reverse buffer is associated with a component of the wireless network, such as a transceiver. In an additional exemplary embodiment, the reverse buffer is associated with the mobile communication device.

Accordingly, in a first aspect, the present invention provides a set of computer-useable instructions to provide a method of optimizing a unicast stream of media content through a wireless telecommunications network. The method includes communicating a first request for the media content to be streamed to a first mobile communication device. The first request is communicated to a catalog to determine if the media content has been reverse buffered. The method also includes receiving at the first mobile communication device the media content from a host of the media content. The method additionally includes buffering the media content on the first mobile communication device and reverse buffering the media content on the first mobile communication device. The method also includes presenting the media content on the first mobile communication device. The method additionally includes receiving at the first mobile communication device a second request from a second mobile communication device for the reverse buffered media content. The second request was directed to the first mobile communication device by the catalog as a result of the catalog indicating that the first mobile communication device includes the reverse buffered media content associated with the media content. The method also includes communicating at least a portion of the reverse buffered media content stream to the second mobile communication device from the first mobile communication device.

In a second aspect, the present invention provides computer-readable media having computer-executable instructions embodied thereon for performing a method of optimizing a unicast stream of media content through a wireless telecommunications network. The method includes communicating a first request for the media content to be streamed to a first mobile communication device. The first request is communicated to a catalog to determine if the media content has been reverse buffered. The method also includes receiving at the first mobile communication device the media content from a host of the media content, buffering the media content on the first mobile communication device, reverse buffering the media content on the first mobile communication device, and presenting the media content on the first mobile communication device. The method additionally includes receiving at the first mobile communication device a second request from a second mobile communication device for the reverse buffered media content. The second request is directed to the first mobile communication device by the catalog as a result of the catalog indicating that the first mobile communication device includes the reverse buffered media content associated with the media content. The method also includes communicating at least a portion of the reverse buffered media content stream to the second mobile communication device from the first mobile communication device.

In a third aspect, the present invention provides computer-readable media having computer-executable instructions embodied thereon for performing a method of optimizing a unicast stream of a media content through a wireless telecommunications network. The method includes receiving at a catalog a first request from a first mobile communication device for the media content, determining in the catalog that the media content is not available as a reverse buffered media content, and directing the first request to a host of the media content. The method also includes associating in the catalog that the media content is associated with a reverse buffered media content, such that the reverse buffered media content is further associated with a location identifier of the location where the reverse buffered media content is reverse buffered. The media content is reverse buffered as a result of the first request. The method additionally includes receiving at the catalog a second request from a second mobile communication device for the media content, determining the media content is available as reverse buffered media content, and directing the second request for the media content to the reverse media content based on the location identifier.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
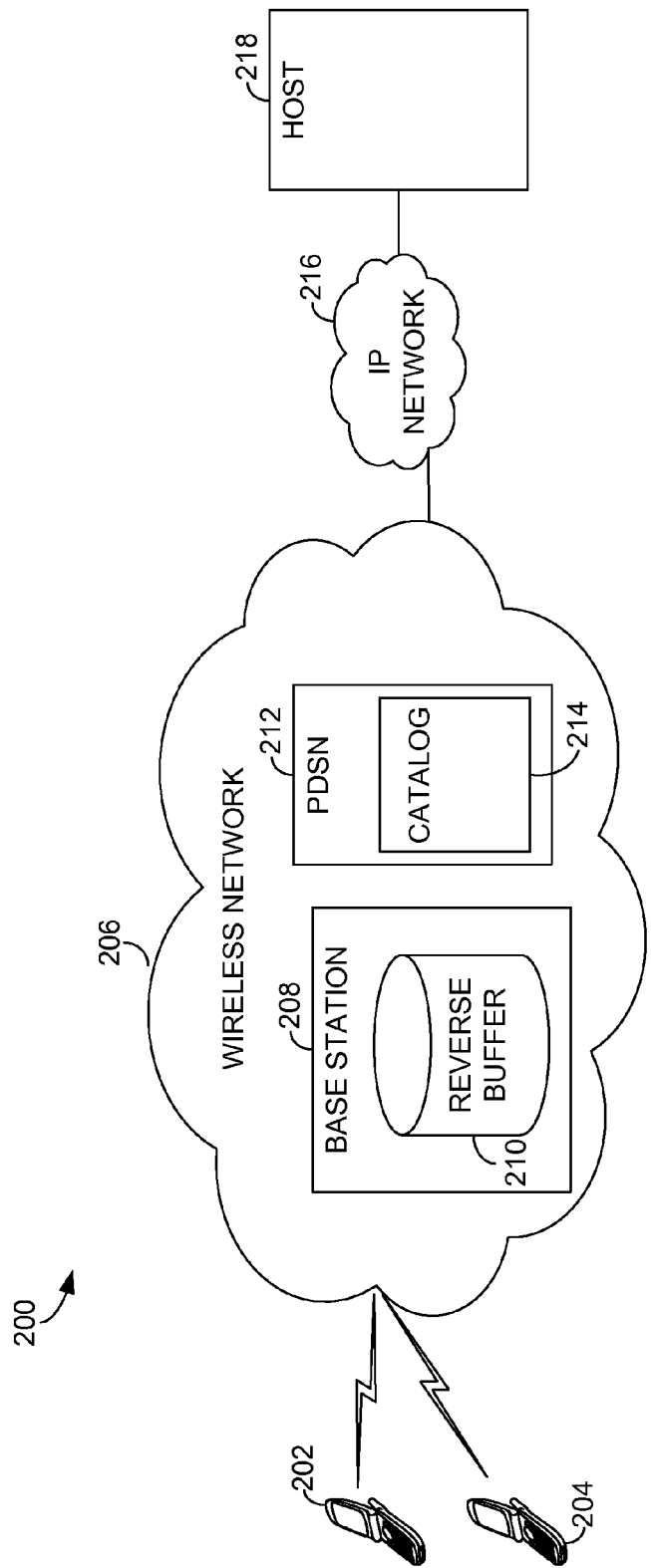
FIG. 2 depicts a reverse buffering environment suitable for implementing embodiments of the present invention.

With reference to FIG. 2 that depicts an exemplary reverse buffering environment suitable for implementing embodiments of the present invention is shown and designated generally as reverse buffering environment 200. The reverse buffering environment 200 is but one example of a suitable reverse buffering environment and is not intended to suggest a limitation as to scope of use, functionality, or design of the claimed invention. Neither should reverse buffering environment 200 be interpreted as having any dependency or requirement relating to any one or combination of modules/components illustrated.

A mobile communications device 202 is a computing device, such as computing device 100 discussed with reference to FIG. 1. The mobile communications device 202, in an exemplary embodiment, is a mobile communications device that is capable to communicate by way of a telecommunications network. The mobile communications device 202, in an exemplary embodiment, includes devices such as cellular phones, smart phones, personal data assistants (PDA), and other computing devices that communicate by way of a wireless network. Additionally, the mobile communications device 202, in an exemplary embodiment, receives, buffers, presents, stores, and/or communicates media content streams. Therefore, the mobile communications device 202 can include a presentation component, such as a screen, a speaker, or other output components that allow a media content stream to be presented by the mobile communications device.

A media content stream is multi-media that can be communicated to the mobile communications device 202. For example, the media content stream may include audio information, such as music, speech, ring tones, and other information that can be transformed into a sound. Additionally, the media content stream may include video content, such as streaming video, television video, on-demand video, live video, and other information that can be transformed into a video presentation. The use of the term video is not limited to only a visual presentation, but video also includes related audio elements. For example, a video stream of a near real-time televised event that is received by the mobile communications device 202 will include both the visual aspects of the televised event as well as the audible aspects. Additionally, it is contemplated that video can also include closed captioning and other techniques know to those with skill in the art to communicate information.

A mobile communications device 204 is a computing device, such as computing device 100 discussed with reference to FIG. 1. In an exemplary embodiment, the mobile communications device 204 is comparable to the mobile communications device 202. Therefore, the mobile communications device 202 and the mobile communications device 204 may include compatible components and features that facilitate the communication of a media content stream (media content) between the two devices. For example, both the mobile communications device 202 and 204, in an exemplary embodiment, communicate by way of a telecommunications network. In an alternative exemplary embodiment, the mobile communications devices 202 and 204 communicate by way of short-range communication technology, such as BLUETOOTH. The utilization of short-range technology allows a personal area network to be established between the mobile communications device 202 and the mobile communications device 204 that facilities the communication of information and data among those devices.

A wireless network is represented by the numeral 206. A wireless network is a network that facilitates the communication of information to mobile communications device 202. In an exemplary embodiment, the wireless network 206 is a wireless telecommunications network. A wireless telecommunications network is depicted by numeral 206. A wireless telecommunications network refers to any type of telecommunications network that is at least partially wireless. Examples of a wireless telecommunications network technologies that are compatible with wireless network 206 include, but are is not limited to, Global System for Mobile communications (GSM), General Packet Radio Service (GPRS), Code Division Multiple Access (CDMA), CDMA2000, CDMAOne, Time Division Multiple Access (TDMA), Universal Mobile Telecommunications System (UMTS), Integrated Digital Enhanced Network (iDEN), and Personal Communications Service (PCS).

An exemplary embodiment includes a wireless telecommunications network that operates in about the frequency bands of GSM. GSM networks generally operate in four different frequency ranges. The first two ranges operate in the 900 MHz or 1800 MHz bands. Some countries in the Americas (including Canada and the United States) use the 850 MHz and 1900 MHz bands because the 900 and 1800 MHz frequency bands were already allocated. In the 900 MHz band, the uplink frequency band is 890-915 MHz, and the downlink frequency band is 935-960 MHz. The third and fourth ranges include the 400 and 450 MHz frequency bands.

Another exemplary embodiment includes a wireless telecommunications network that operates in about the frequency bands of UMTS. The specific frequency bands originally defined by the UMTS standard include 1885-2025 MHz for the mobile-to-base (uplink) and 2110-2200 MHz for the base-to-mobile (downlink). In the United States, 1710-1755 MHz and 2110-2155 MHz are utilized. Additionally, in some countries UMTS operators use the 850 MHz and/or 1900 MHz bands.

Yet another exemplary embodiment includes a wireless telecommunications network that operates in about the frequency bands of PCS. PCS utilizes the 1900-MHz radio band, which includes the frequency band of 1850-1990 MHz, for digital mobile phone services.

A wireless telecommunication network includes a transceiver. The transceiver, in part, facilitates wireless communication between the wireless network 206 and the mobile communications device 202. Examples of a transceiver include a Node B and a Base Station. A Node B transceiver includes radio frequency transmitter(s) and receiver(s) used to communicate with the mobile communications device 202. Typically, a Node B is utilized in a UMTS system. A base station also includes radio frequency transmitter(s) and receiver(s) used to communicate with the mobile communications device 202. A base station is typically utilized in a GSM or CDMA system. In an exemplary embodiment, a transceiver is coupled, either directly or indirectly, to a computing device that buffers and reverse buffers information, such as streaming media content.

A base station is generally indicated by the numeral 208. In an exemplary embodiment, the base station 208 includes a reverse buffer 210.

A reverse buffer stores, at least temporarily, information that is normally consumed from a buffer. For example, a typical buffer will receive information, such as media content, and store the information until a predetermined threshold, such as time or capacity, is achieved before utilizing the received information. Once the received information is utilized, the information is consumed and no longer available for further utilization. The reverse buffer stores the buffered content so that even after the information is consumed from the buffer, a form of the information is stored in the reverse buffer. In an exemplary embodiment, the reverse buffered information is not accessible to the device or component that originally buffered the information. For example, if the mobile communications device 202 requested a video stream, the video stream is buffered, at least partially, at the mobile communications device 202 prior to being presented on the mobile communications device 202. Upon being buffered on the mobile communications device 202, the video stream is reverse buffered on the mobile communications device 202, but the reverse buffered video stream can not be presented on the mobile communications device 202 unless authorization, such as originally required to receive the video stream, is communicated. As a result, the mobile communications device 202 now includes the reverse buffered video stream, but the reverse buffered video stream is maintained on the mobile communications device 202 to be communicated to other mobile communications devices as opposed to being maintained for future presentation on the mobile communications device 202.

Returning to FIG. 2, the reverse buffer 210 is a data store that stores reverse buffered information, such as media content that was buffered. In an exemplary embodiment, the reverse buffer 210 utilizes computer storage media to store the reverse buffered information. While the reverse buffer 210 is depicted in association with the base station 208, the reverse buffer 210 can be associated with the mobile communications device 202, or any component of the wireless network 206.

A Packet Data Serving Node (PDSN) is generally referenced by numeral 212. A PDSN is a component in a CDMA network. The PDSN serves as a connection point between the base station 208 and an Internet Protocol (IP) network. The PDSN 212 monitors what information, such as media content streams, that have been requested and communicated by way of the mobile network 206. In an exemplary embodiment, a Gateway GPRS Support Node (GGSN) that is typically associated with a GSM and/or a UMTS network may also be utilized. A PDSN may represent the combination of a GGSN and a Serving GPRS Support node (SGSN).

A PDSN provides mobility management functions, which are similarly provided by a SGSN. The PDSN also provides packet routing functionality, which is similarly provided by a GGSN in a GPRS/UMTS network.

In an exemplary embodiment, the PDSN 212 is coupled to a catalog 214. A catalog stores a registry of data associated with information that is requested and communicated by way of the wireless network 206. For example, the catalog 214 stores data relating to the media streams that have been requested and/or communicated by way of the wireless network 206. The data maintained by the catalog 214 can include the time the media content was communicated, the time the media content was requested, the time the media content expires, the portions/sections of the media content reverse buffered, the location of reverse buffered media content, the protocols of the reverse buffered media (i.e., codecs), the capacity of the reverse buffer, the capacity of the wireless network, the authorization level of the requesting device, and the authorization of the device to which the reverse buffer is associated.

Catalog 214 is utilized to store data associated with media streams that are reverse buffered either within the wireless network 206 and/or on the mobile communications device 202. The catalog 214 is also utilized to redirect an incoming request for media content to a reverse buffer, such as reverse buffer 210 that has the requested media content reverse buffered thereon.

The wireless network 206 communicates with an IP network 216. An IP network is a computing network that utilizes IP protocol as a network layer protocol. The network may include, without limitation, one or more local networks, (LANs) and/or wide area networks (WANs). Such networking environments are commonplace in offices, enterprise-wide computer networks, intranets, and the Internet.

A host is generally depicted by the numeral 218. A host is a data store that contains one or more of the requested information. For example, host 218 is a computing device, such as computing device 100 previously discussed with reference to FIG. 1 that stores media content that is requested by mobile communications device 202. Host 218 is a server that stores media content that can be communicated to mobile communications device 202 by way of the IP network 216 and the wireless network 206. In an exemplary embodiment, host 218 is a media server that serves media content to requesting mobile communications devices.

In an exemplary embodiment, mobile communications device 202 requests media content. The request is wirelessly communicated from the mobile communications device 202 to the host 218, by way of the wireless network 206 and the IP network 216. In response to the request, the host 218 communicates the requested media content by way of the IP network 216 to the wireless network 206. The catalog 214 updates a catalog to indicate that the media content has been communicated from the host 218 to the mobile communications device 202. The catalog 214 additionally indicates data relating to the media content such as the location where it is reverse buffered, such as reverse buffer 210, the period of time the media content will be available at the reverse buffer 210, and a location identifier of the reverse buffer 210. The media content is received at the base station 208, which buffers the media content prior to communicating the media content wirelessly to the mobile communications device 202. The reverse buffer 210 reverse buffers the buffered media content. The catalog 214 is updated to indicate the reverse buffering of the media content at the reverse buffer 210. The buffered media content is communicated to the mobile communications device 202.

Continuing with the exemplary embodiment, the mobile communications device 202 receives the requested media content and presents the media content. Independent of the mobile communications device 202 request for the media content, the mobile communications device 204 requests the media content. The request for the media content from mobile communications device 204 is communicated by way of the wireless network 206. The catalog 214 is queried to determine if the requested media content is reverse buffered at a location, from the perspective of the mobile communications device 204, prior to the host 218. The catalog 214 includes an indication that the requested media is reverse buffered at the reverse buffer 210. The catalog 214 redirects the request for the media content to the reverse buffer 210. The reverse buffer 210 is utilized to provide the requested media content to the mobile communications device 204.

This exemplary embodiment illustrates an advantage of reverse buffering the media content at a location prior to the host. The reverse buffered media can be communicated to the requester without utilizing additional resources, which may be limited, such as the bandwidth of the IP network 216, or the capacity of the host 218. Additionally, the reverse buffered media content is distributed in nature as opposed to centralized at a host 218 or collection of hosts.

In an alternative exemplary embodiment, the reverse buffer 210 is associated with the PDSN 212 such that the reverse buffer 210 is deeper in the wireless network from the perspective of the requesting mobile communications device. A reverse buffer 210 at the PDSN can serve multiple base stations/transceivers that utilize the PDSN. Therefore, the reverse buffer 210 is available to a larger number of mobile communications devices that can request the media content.

In an additional exemplary embodiment, a reverse buffer is associated with a requesting mobile communications device. For example, the mobile communications device 202 requests a media content, the catalog 214 is queried and determines that the media content is not reverse buffered at an accessible location, therefore, the mobile communications device 202 receives the requested media content from the host 218. The mobile communications device 202 reverse buffers the media content and the catalog 214 is updated to indicate that the media content is reverse buffered at the mobile communications device 202. Mobile communications device 204 requests the media content. The catalog 214 is queried and determines that the media content is reverse buffered at the mobile communications device 202. The request for the media content is redirected to the mobile communications device 202 that receives the request and communicates the reverse buffered media content to the mobile communications device 204. The communication of the reverse buffered media content can be by way of the wireless network 206 or by a short-range communication technology such that the media content is communicated directly from the mobile communications device 202 to the mobile communications device 204.

The wireless network 206 is depicted in the exemplary embodiment of FIG. 2 as including a base station 208 and a PDSN 212; both components are typically associated with a wireless telecommunications network. But, the wireless network is not limited to a wireless telecommunication network, instead a wireless network includes networks compatible with Wi-Fi protocols, short-range communication network technologies, Wi-Max protocols, wireless LANs, and wireless WANs.

Figure 3:
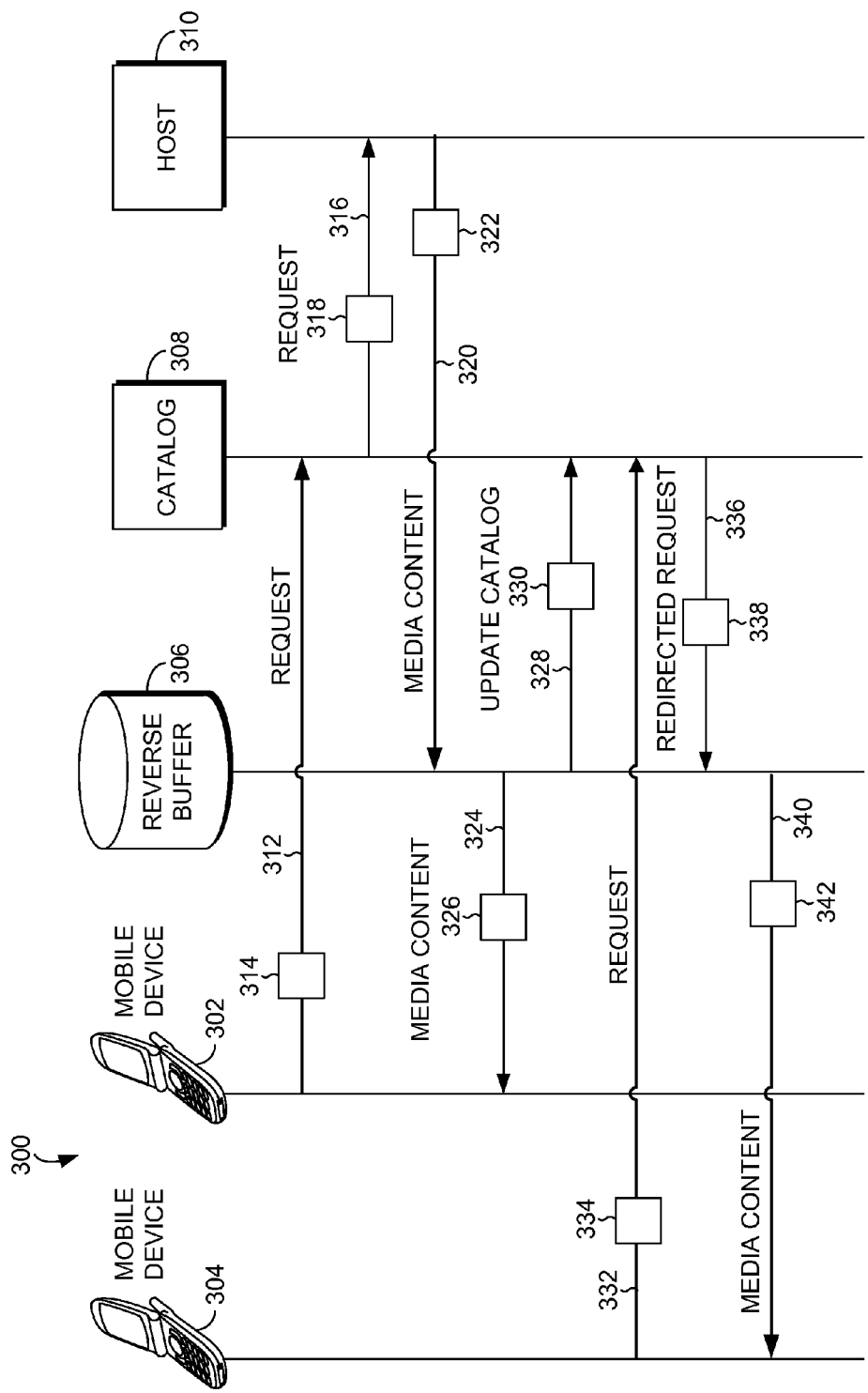
FIG. 3 depicts a communications flow diagram for reverse buffering a media content stream in accordance with an embodiment of the present invention.

Turning now to FIG. 3 that depicts a communication flow diagram of an exemplary embodiment for reverse buffering a media content stream as generally depicted by numeral 300. The flow diagram 300 depicts a mobile communications device 302, a mobile communications device 304, a reverse buffer 306, a catalog 308, and a host 310. The mobile communications device 302 is comparable to the mobile communications device 202. The mobile communications device 304 is comparable to the mobile communications device 204. The reverse buffer 306 is comparable to the reverse buffer 210. The catalog 308 is comparable to the catalog 214. In addition, the host 310 is comparable to the host 218. All have been previously discussed with reference to FIG. 2.

The mobile communications device 302 communicates 312 a request 314 that is queried at catalog 308. The request 314 is inspected to determine if the media content of the request is cataloged in the catalog 308. Media content is cataloged in the catalog 308 when the media content is available as reverse buffered media content at a location other than the host 310 to the reverse buffer 306. The request 314 is communicated 316 as a request 318 (comparable to request 314) to the host 310. The host 310 receives the request and communicates 320 the media content 322. In the exemplary embodiment, the reverse buffer 306 is associated with a component of the wireless network prior to the mobile communications device 302, such as a base station that buffers the media content 322.

Media content 326 is communicated 324 from the reverse buffer 306 to the mobile communications device 302. In an alternative exemplary embodiment, the media content 322 is communicated to the mobile communications device 302 without being reverse buffered prior to reception by the mobile communications device 302. In an additional exemplary embodiment, the media content 322 is communicated to mobile communications device 302 contemporaneously to the reverse buffer 306 for reverse buffering the media content 322. Therefore, media content 322 and media content 326 are similar media content when presented.

Returning to FIG. 3, once the reverse buffer 306 reverse buffers the media content 322, an update 330 is communicated 328 to the catalog 308. The update 330 provides information associated to the reverse buffered media content that is reverse buffered on the reverse buffer 306. The information may include a location identifier of the reverse buffer. Examples of location information include, but are not limited to, a Domain Name System (DNS) identifier, an IP address, a port identifier, a Media Access Control (MAC) identification, and a Subscriber Identity Module (SIM) card identifier. Additional information that may be included with the update 330 includes the valid time period for the reverse buffered media content on the reverse buffer. For example, the reverse buffered media content may only be valid for a predefined period of time. The information can also include coding information of the reverse buffered media content. For example, the coding information indicates the file format, the bit rate, the codec, the rating, or other information that will aid in determining if the reverse buffered media content can be utilized by a requesting mobile communications device. Additionally, the information of the update 330 can include information relating to the resources allocated to the reverse buffered media content. For example, the resources allocated may include the amount of storage and/or bandwidth necessary for the communication and presentation of the media content and/or the network resources necessary for the communication and/or presentations of the media content.

The catalog 308 is updated to include the information of the update 330. The catalog therefore can redirect requests for media content to the reverse buffer 306 when the requested media content can be associated with reverse buffered media content.

Mobile communications device 304 communicates 332 a request 334 for the media content. The request 334 is inspected by the catalog 308. The catalog inspects the request 334 to determine if there is a reverse buffered media content that is related to the requested media content. When it is determined that the requested medium content is available as reverse buffered media content, the request 334 is redirected as a communication 336 of a request 338. The request 338 may be similar to the request 334, or the request 338 may also be an altered request to reflect the fact it has been redirected. The reverse buffer 306 communicates the reverse buffered media content to the mobile communications device 304.

In an alternative exemplary embodiment, the catalog 308 communicates with the mobile communications device 304 that the reverse buffer 306 has the requested media content reverse buffered. As a result, the mobile communications device 304 communicates a request to the reverse buffer 306 for the media content.

Figure 4:
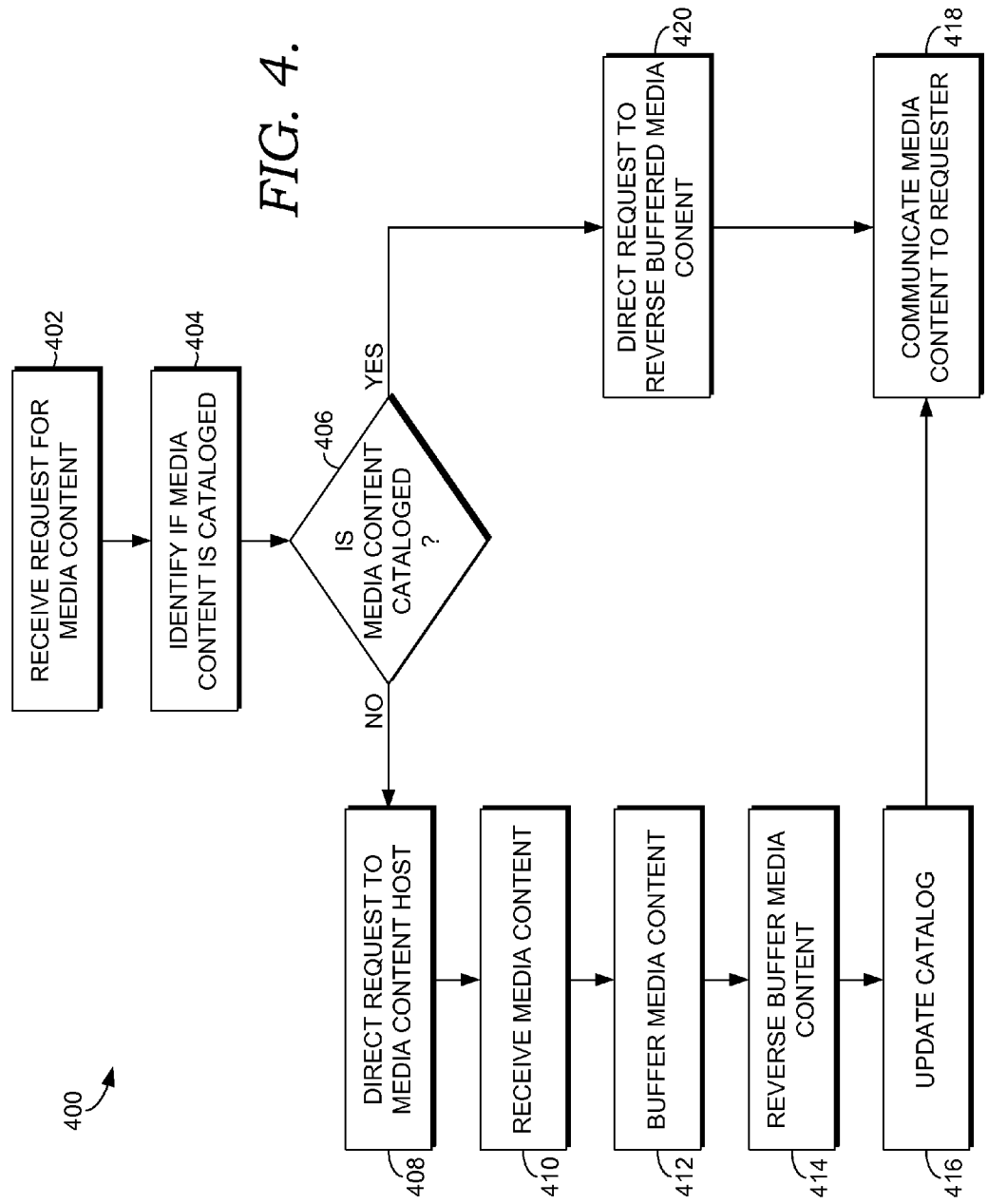
FIG. 4 depicts a method of optimizing a unicast stream of media content through a wireless network in accordance with an embodiment of the present invention.

Turning now to FIG. 4 that depicts an exemplary method of optimizing a unicast stream of media content through a wireless network. A unicast is the communications of information to a single destinations. This is compared to multicasting where information is communicated to select group of destinations. Also compared to broadcasting where the information is communicated to all destination of a defined grouping, such as a common network or domain. It is understood that the various embodiments discussed herein are applicable to unicast, multicast, and broadcast communication schemes. Streaming as used herein is the communication of data or information from one point to another point. In an exemplary embodiment, streaming refers to the communication of data or information on an as needed or on an as available basis. For example, a request for video content of a live televised event will be streamed (read communicated) to the requester as it occurs. This is in contrast to waiting until the entire video of the event has been stored and then transmitting the complete data file to the requester. Streaming allows for data and information to be constantly received by the requester and utilized, such as presented, while it is being supplied by the media content provider.

At a step 402, a transceiver, such as a base station, receives a request for a media content. The request is received from a mobile communications device by way of a wireless communication. The request, in an exemplary embodiment, includes information relating to the capabilities and capacities of the requesting wireless device. Additionally, the request includes a unique identifier of the requesting device to facilitate the communication of the media content to the requesting device.

At a step 404, a catalog that includes an indication of media content that is available as reverse buffered media content is queried to identify if the requested media content is available to be communicated to the requesting device. At a step 406, a determination is made whether the requested media content is available as reverse buffered media content. When the media content has been determined as not being available as reverse buffered media content, at a step 408, the transceiver directs the request to the identified host of the requested media content. For example, when a mobile communications device requests a live video stream, the catalog is queried to determine if another mobile communications device has recently requested the same video stream, if that video stream has not been reverse buffered, the request is directed to the host or provider of the requested video stream. In an exemplary embodiment, the request includes an identifier of the host of the video content, but the request may also include an indication that is utilized by the wireless network to locate the host of the requested video stream. Therefore, the directing of the request means the request is communicated to the host of the requested media content regardless of if the request included an identifier of the host or if the host was later determined.

At a step 410, the transceiver receives the requested media content from the host. The media content is received by way of an IP network. At a step 412, the transceiver buffers the requested media content in anticipation of communicating the media content to the requesting mobile communications device. The buffering of the media content prior to communicating the media content to the requesting mobile communications device minimizes errors of the IP network, such as latency, from affecting the presentation of the media content by the mobile communications device.

At a step 414, the transceiver reverse buffers the media content. The reverse buffering of the media content includes transferring the media content from the buffer to a second data store that serves as a reverse buffer. In an exemplary embodiment, the reverse buffering occurs contemporaneously with the communication of the buffered media content, therefore, instead of consuming the buffered media content as it is communicated, it is reverse buffered. In an alternative exemplary embodiment, the mobile communications device reverse buffers the media content as it is presented.

At a step 416, the transceiver communicates an update to a catalog that provides an indication that the requested media content is reverse buffered. The update includes a location identifier of the reverse buffered media content to facilitate the locating of the reverse buffered media content by other requesting mobile communications devices. As previously discussed, the update can also include other information to facilitate the optimization of a unicast stream of media content.

At a step 418, the transceiver communicates the media content to the requesting mobile communications device. In an exemplary embodiment, the reverse buffering and the updating of the catalog are transparent to the requesting mobile communications device. For example, the performance of the requesting device will not be adversely affected as a result of the reverse buffering of the media content.

At a step 420, when it is determined at step 406 that the requested media content is cataloged in the catalog, the request is directed to the reverse buffer associated with the reverse buffered media stream that is related to the requested media stream. As previously discussed, the direction of the request to the reverse buffer is facilitated by the information included in the catalog that indicates the location of the reverse buffer. The reverse buffer communicates the reverse buffered media content to the requesting mobile communications device as shown at step 418. In an exemplary embodiment, the communication of the reverse buffered media content is by way of the transceiver. But, in an alternative exemplary embodiment, where the reverse buffer is coupled to a mobile communications device that is within range to communicate the reverse buffered media content by way of a short-range communications technology, the reverse buffered media content is communicated without the transceiver.

Figure 5:
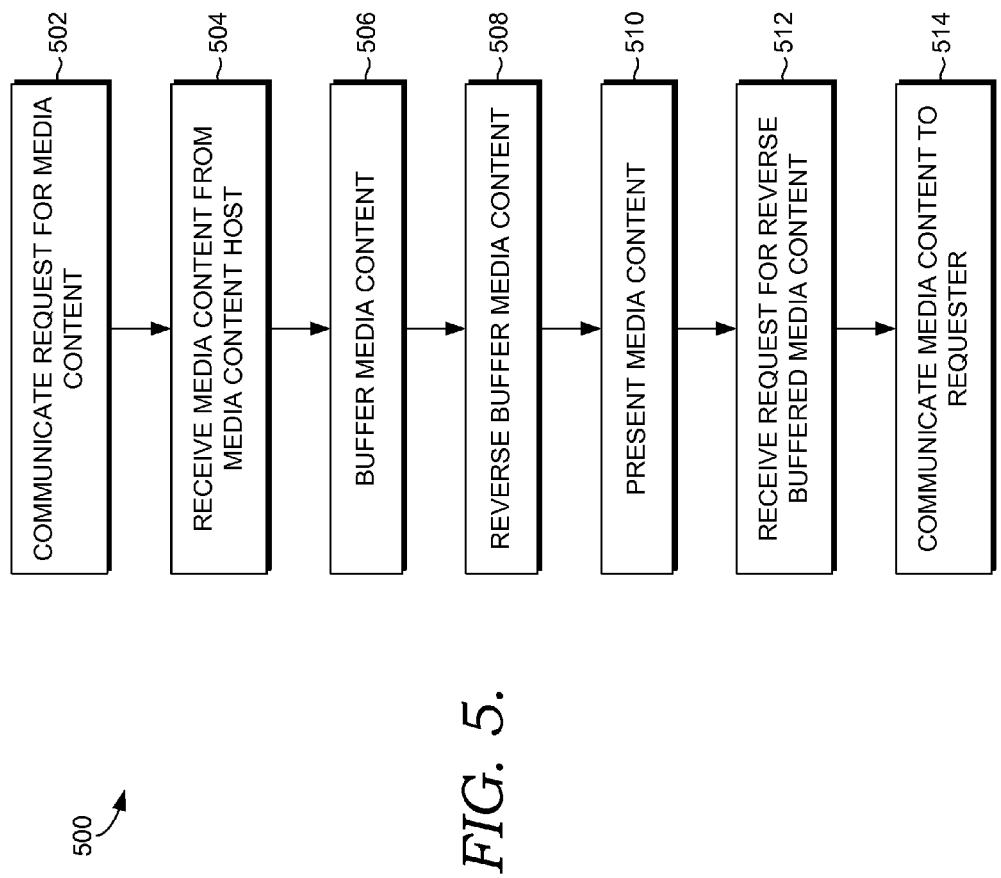
FIG. 5 depicts a method of optimizing a unicast stream of media content through a wireless network in accordance with an embodiment of the present invention.

Turning to FIG. 5, a flow diagram is provided that depicts an exemplary method 500 of optimizing a unicast stream of a media content through a wireless network as generally depicted by numeral 500. In an exemplary embodiment, the method 500 is facilitated by computer-readable media having computer-executable instructions embodied thereon for performing the method, or other exemplary methods.

At a step 502, a mobile communications device, such as the mobile communications device 202 previously discussed with respect to FIG. 2, communicates a request for a media content stream to be communicated to the requesting mobile communications device (such as mobile communications device 202). The request is received by a catalog, such as the catalog 212 previously discussed with respect to FIG. 2. The catalog receives the request to determine if the requested media content has been reverse buffered and is available as reverse buffered media content. The availability of the reverse buffered media content may depend on the capacity of the requesting device, the capacity of the reverse buffer, the permissions of the requesting device, and other data that may be stored in the catalog in association with the indication as to whether the media content is available.

At a step 504, the mobile communications device receives the requested media content from the media content host, such as the host 218 previously discussed with reference to FIG. 2. In this exemplary embodiment, the requested media content is received from the media content host as a result of the catalog determining that the requested media content was not available as reverse buffered media content. Also, the media content is streamed from the host to the requesting mobile communications device by way of, in part, a wireless network.

At a step 506, the mobile communications device buffers the media content as it is received to ensure presentation of the media content at a predefined minimum quality. In an exemplary embodiment, the mobile communications device includes one or more rules to determine how the received streaming media content is buffered. For example, the streaming rate, such as bit rate, the reliability of the information or data, such as data packets, and the quality of the stream, such as the number of corrupted or dropped packets, are all considered when determining how much buffering occurs prior to the mobile communications device presenting the streaming content. In other words, in an exemplary embodiment, the poorer quality of the received media stream, the greater amount of buffering that is performed.

At a step 508, the media content is reverse buffered at the requesting mobile communications device. In an exemplary embodiment, the reverse buffering of step 508 is contemporaneous to the presenting of the media content as represented at a step 510. For example, the requesting mobile communications device receives that requested media content at step 504. The requesting mobile communications device then buffers the media content as it is received to facilitate a higher quality presentation. The mobile communications device then begins presenting the media content at step 510. But, instead of consuming the media content as it is presented, the media content is reverse buffered at step 508. In an exemplary embodiment, the reverse buffered media content is not accessible for presentation by the mobile communications device on which the reverse buffered media content is associated. The reverse buffered content, in this exemplary embodiment, is only available for presentation once it has been authorized or given permissions to present the reverse buffered media content. Also, in an exemplary embodiment, the reverse buffered media content is communicated from the mobile communications device and not presented on the mobile communications device. The intent to communicate the reverse buffered media content is different from an intent to merely store the media content on the mobile communications device for later playback.

The presentation of the media content at step 510 includes transforming the media content into a form that is intended for an audience. For example, a media content stream that is both a video stream and an audio stream is presented by displaying the video portions of the media content and audibly projecting the audio portions of the media content. The display of the video portion may be facilitated by a screen or other viewing output component of the mobile communications device. The audible projection of the audible portion of the media stream can be facilitated by a speaker associated with the mobile communications device. The presentation of the media stream can be facilitated by a number of components and modules of the mobile communications device, such as those previously discussed with reference to computing device 100 of FIG. 1.

Returning to step 508, the media content is reverse buffered at the mobile communications device. The catalog is updated to indicate that the mobile communications device now is associated with the reverse buffered media content. The update of the catalog is initiated in one embodiment by the streaming of the media content through the wireless network, where it is recognized that the mobile communications device will reverse buffer the media content. Or, in an alternative exemplary embodiment, the mobile communications device communicates, to the catalog, an indication that the reverse buffered media content is associated with the mobile communications device.

At a step 512, the requesting mobile communications device receives a request from a second mobile communications device, such as mobile communications device 204 of FIG. 2. For purposes of discussion, the initial requesting mobile communications device that is associated with the reverse buffered media content will be referred to as a first mobile communications device. Additionally, for discussion purposes only, the second requesting device will be referred to as the second mobile communications device.

In an exemplary embodiment, the first mobile communications device receives a request for the reverse buffered media content. The request is from the second mobile communications device. The second mobile communications device originally communicated a request for the media content, but the catalog determined that the first mobile communications device is associated with the reverse buffered media content. The reverse buffered media content would fulfill the second mobile communications device's request; therefore, the request is directed to the first mobile communications device. The request includes a unique identifier of the second mobile communications device. The unique identifier facilitates the communication of the reverse buffered media content to the second mobile communications device, as indicated at a step 514.

The communication of the reverse buffered media content can include utilizing at least a portion of a wireless network. For example, the first mobile communications device can communicate the reverse buffered media content to a transceiver along with the unique identifier of the second mobile communications device. The transceiver utilizes the unique identifier to direct the reverse buffered media content to the second mobile communications device.

Figure 6:
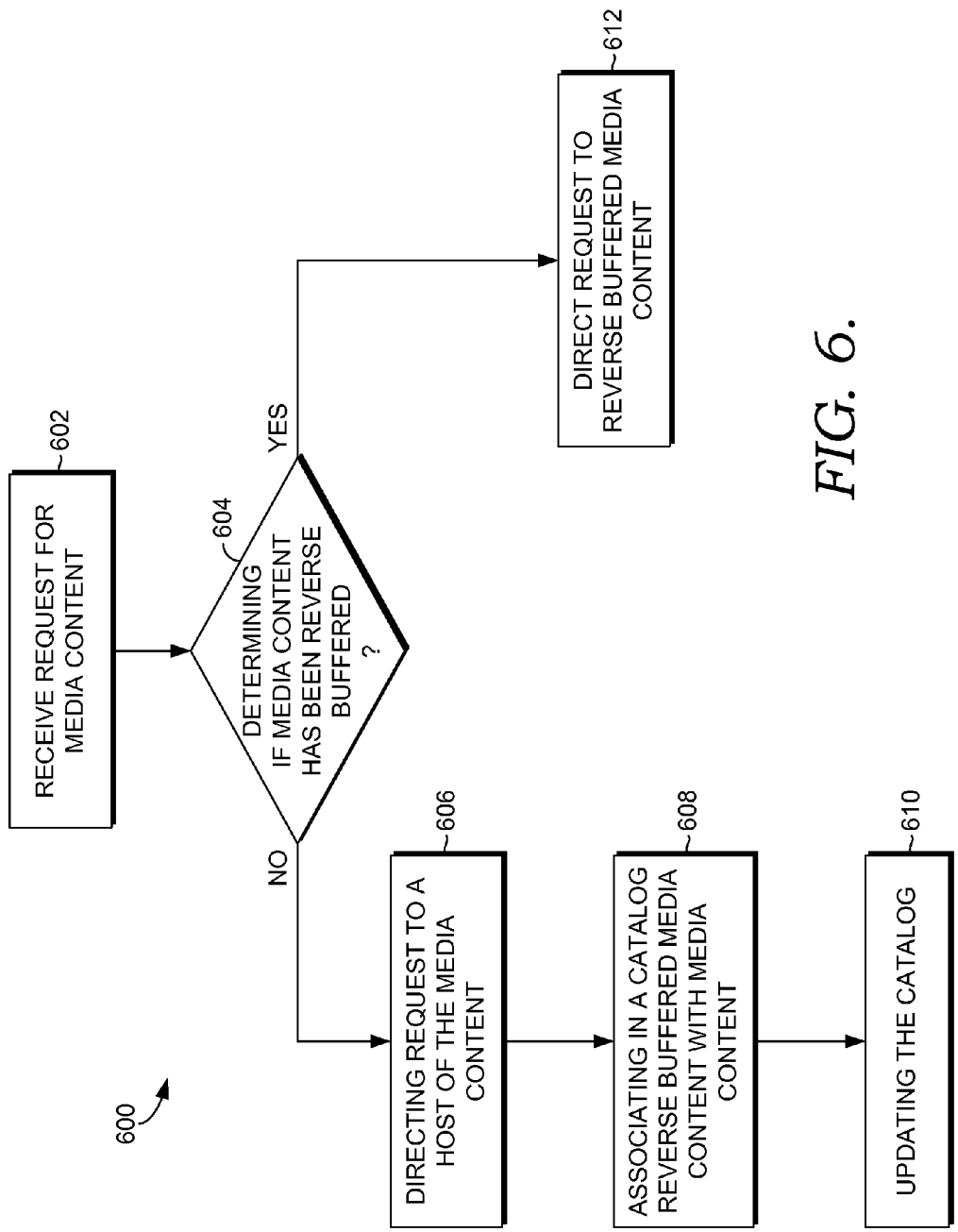
FIG. 6 depicts a method of optimizing a stream of a media content through a wireless network in accordance with an embodiment of the present invention.

Turning now to FIG. 6, a flow diagram is provided that depicts an exemplary method 600 of optimizing a stream of a media content through a wireless network. At a step 602, a catalog, such as the catalog 214 discussed with reference to FIG. 2, receives a request from a first mobile communications device, such as mobile communications device 202 as previously discussed with reference to FIG. 2. The request is for a media content stream to be communicated to the first mobile communications device. The request may include additional information that further defines the first mobile communications device.

At a step 604, the catalog determines if the requested media content is available as reverse buffered media content. In an exemplary embodiment, the catalog determines if the requested media content is reverse buffered at a reverse buffer that is able to communicate with the requesting device. If that communication can be facilitated either directly between the requesting device and the reverse buffer or by way of a wireless network, then the reverse buffered media content can be determined to be available. Additionally, the determination if the reverse buffered media content is available can include determining if the technical requirements of the requesting device are satisfied by the reverse buffered media content. For example, if the requesting device is a mobile phone that is only capable of presenting a video stream of a maximum bit rate and of a certain file format, the available reverse buffered media content is evaluated to determine if it satisfies the technical requirements of the requesting device.

At a step 606, the catalog determines that the requested media content is not available as reverse buffered media content and directs the request on to the host of the requested media content. For example, the request may include the location information necessary for communicating with the host of the media content, but the catalog intercepted the request to make the determination of the availability of the media content as reverse buffered media content prior to allowing the request to be communicated to the host. In an additional exemplary embodiment, the request is directed to the catalog, after determining the media content is not available as reverse buffered media content, the catalog directs the request to an appropriate host of the media content.

In an exemplary embodiment, the host receives the request for the media content and begins streaming (communicating) the media content to the requesting device. The streaming media content is buffered prior to presentation. The buffering may occur at a transceiver, at the requesting device, at other components along the communication pathway, or at any combination of components and devices. In an exemplary embodiment, once the buffering process has started, the buffered media content can also be reverse buffered at the same component/device as it is buffered, or at a separate component/device from where it is buffered. Additionally, the reverse buffering, in an exemplary embodiment, is reverse buffered utilizing the same storage media as the buffer utilizes. Or, in an alternative exemplary embodiment, the reverse buffer utilizes a different storage media to reverse buffer the media content as the buffer utilizes to buffer the media content.

At a step 608, an association is formed between the media content and the reverse buffered media content that was reverse buffered as a result of the communication of the media content. The association creates a link between the requested media content and the reverse buffered media content where the association is logically appropriate, such as the reverse buffered media content is the requested media content, but in a reverse buffered state not residing on the host of the media content. Additionally, the association of the reverse buffered content in the catalog includes a location identifier of the location where the reverse buffered media content is reverse buffered. For example, the location identifier, as previously discussed, may include an IP address, a MAC address, a DNS address, or a unique identifier of a mobile communications device.

At a step 610, the catalog is updated with the information of the association between the media content and the reverse buffered media content. The association allows the catalog to identify if requested content media is available as reverse buffered media content.

When the catalog determines, at step 604, that the requested media content is available as reverse buffered media content, the catalog directs the request to the reverse buffered media content at a step 612. In an exemplary embodiment, the catalog will identify if an association is included in the catalog between a requested media content and a reverse buffered media content. When the association is identified, the information included with the association, such as the location identifier of the reverse buffered media content, is utilized to facilitate the redirection of the request to the reverse buffered media content. In an exemplary embodiment, the request received from the requesting device is redirected to the reverse buffer that includes the reverse buffered media content. In an alternative exemplary embodiment, the requesting device is provided with the location or identity of the reverse buffered media content to facilitate the requesting device to send a request to the reverse buffer for the reverse buffered media content.

Figure 7:
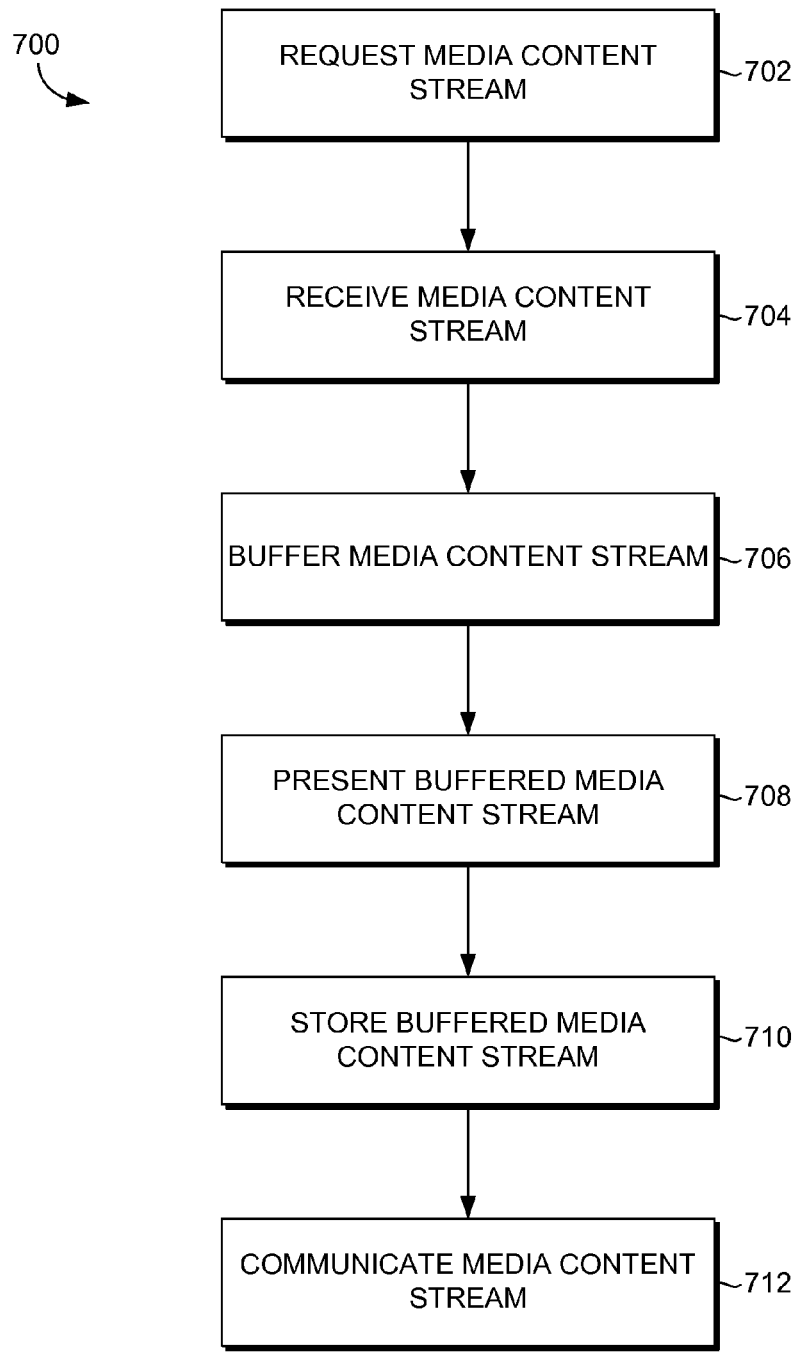
FIG. 7 depicts a method of reverse buffering a media content stream on a mobile communications device that communicates over a telecommunications network in accordance with an embodiment of the present invention.

Turning now to FIG. 7, a flow diagram is provided that depicts an exemplary method 700 of reverse buffering a media content stream on a mobile communications device that communicates over a telecommunications network. At a step 702, a first mobile communications device requests a media content stream to be communicated with the first mobile communications device. The request may include information of the first mobile communications device, such as the capabilities and capacities of the first mobile communications device. At a step 704, the first mobile communications device receives the media content stream. In an exemplary embodiment, the first mobile communications device receives the requested media content stream in a streaming format, therefore, the entirety of the requested media content is not received prior to the media content being presented or reverse buffered.

At a step 706, the first mobile communications device buffers the media content stream. The buffering of the media content stream allows for a higher quality or more consistent presentation of the media content stream. The buffering of the media content stream compensates for delay or other abnormalities typically associated with the communication of streaming media content over a telecommunications network. The buffering of the media content on the first mobile communications device may utilize computer storage media to store the streaming media content in a first-in-first-out (FIFO) fashion. For example, as the media content stream is received the buffer temporarily stores the media content stream until a sufficient capacity of streaming media content has accumulated before presenting the media content stream.

At a step 708, the first mobile communications device presents the buffered media content. As previously discussed, the presentation of the media content stream may include the visual presentation on a screen, the audible presentation of the audible portions of the stream, or other presentation techniques that provide the streaming media content to the user of the first mobile communications device. Typically, the buffered media content stream is consumed and no longer available to be presented or communicated after it has been presented.

In an exemplary embodiment, the first mobile communications device is not allowed to present the reverse buffered media content after the buffered media content was presented. This is to facilitate monitoring the amount, number, and circumstances of the media content stream's presentation. It is contemplated that the mobile communications device can present from the reverse buffer associated with the first mobile communications device, but only upon receiving permission by way of a communication through either a wireless network or other short-range communication technologies.

At a step 710, the first mobile communications device stores the media content stream. In an exemplary embodiment, the media content stream is stored as a reverse buffered media content stream. Additionally, in an exemplary embodiment, the reverse buffering of the media content stream occurs contemporaneously to the buffering of the media content. In an alternative exemplary embodiment, the media content is reverse buffered when the media content is presented, which is a typical time for the media stream to be consumed. The stored media content is accessible to one or more other mobile communications devices that request the stored media content from the first mobile communications device.

In an exemplary embodiment, reverse buffered media content is not accessible to the device on which it is reverse buffered, except with specific authorization or permission. For example, the first mobile communications device that presents the buffered media content is not able to present the reverse buffered media content.

At a step 712, the first mobile communications device communicates at least a portion of the stored media content to a second mobile communications device. For example, the first mobile communications device, that reverse buffered the media content stream, receives a request for the reverse buffered media stream and communicates that reverse buffered media stream to the requesting device (second mobile communications device). In this exemplary embodiment, the second mobile communications device originally communicated a request for the media content. The request initiated a query of a catalog. The catalog indicated that the requested media content stream is available at the first mobile communications device. As a result, the first mobile communications device receives the request for the media content stream.

Figure 8:
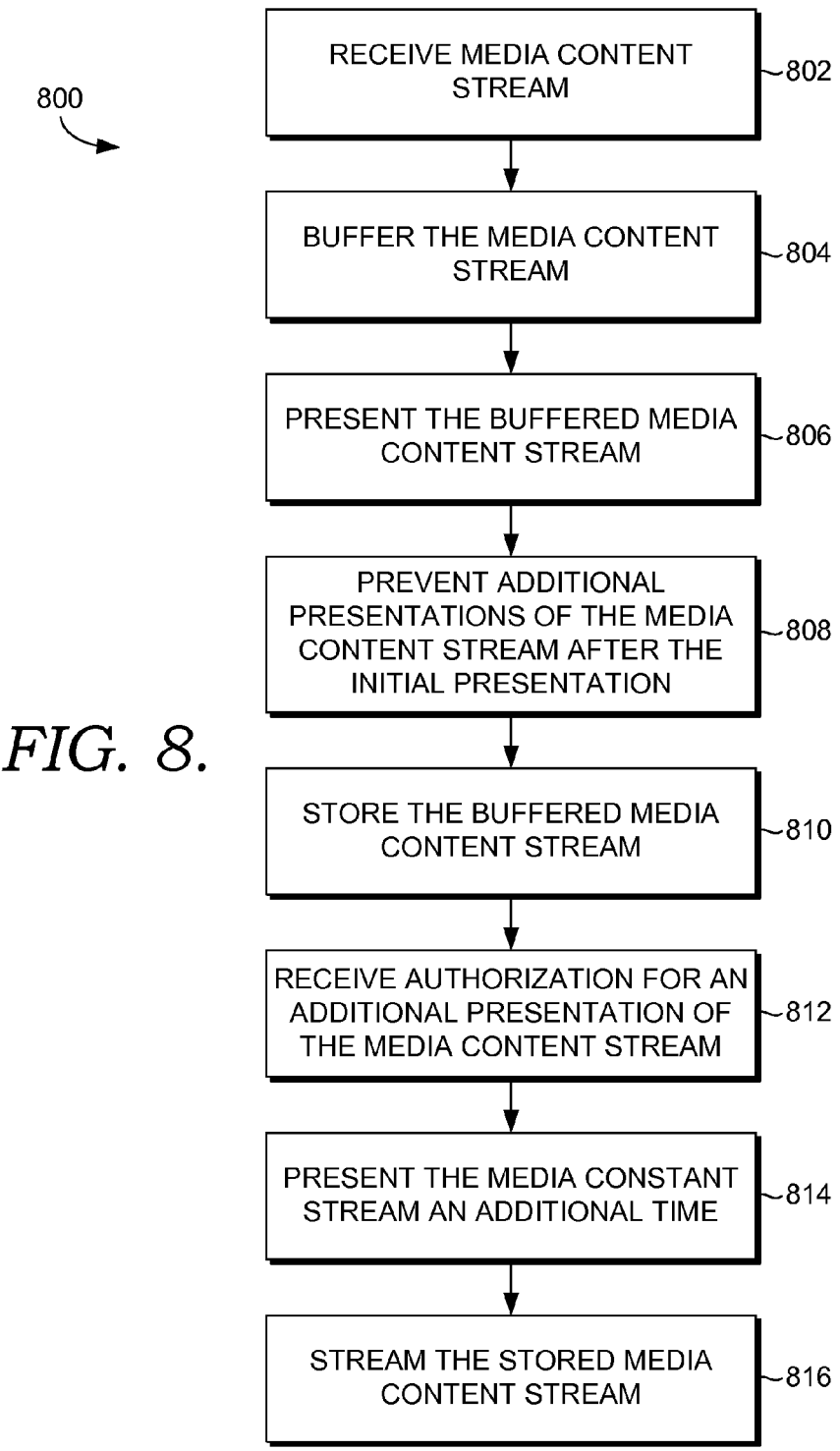
FIG. 8 depicts a method of reverse buffering a media content stream in accordance with an embodiment of the present invention.

Turning now to FIG. 8 that depicts an exemplary method of reverse buffering a media content stream. A mobile communications device receives a media content stream, as generally indicated at a step 802. The media content stream is communicated by way of a wireless telecommunications network, such as one that utilizes CDMA, UMTS, GPRS, or PCS technologies. At a step 804, the mobile communications device, buffers the media content stream as the media content stream is streaming to the mobile communications device. As previously discussed, the media content is buffered at the mobile communications device to achieve a desired presentation quality level. Buffering minimizes network latency and other communications issues from disrupting the presentation of the media content.

At a step 806, the mobile communications device presents the buffered media content stream. Stated in different terms, the media content stream is presented on or by the mobile communications device. At a step 808, the mobile communications device prevents the additional presentation of the media content stream after the initial presentation at step 806. The preventing of the additional presentation may be accomplished by the media content itself, such as by rights management, or by rules of the mobile communications device that prevent additional presentation of the media content. The prevention of additional presentation of the media content applies to reverse buffered media content of the mobile communications device. Therefore, once the media content has been presented an initial instance, the media content, regardless if it is reverse buffered, is prevent from additional presentation.

At a step 810, the mobile communications device stores the buffered media content, such that the buffered media content is reverse buffered. At a step 812, the mobile communications device receives authorization to present the media content an additional instance. For example, if the user of the mobile communications device desires to watch a media content stream that the user had previously viewed on the mobile communications device, the user could request the same media stream in a manner similar to how the media stream was originally requested or by a different manner. An example of a different manner for requesting includes accessing a listing of media content streams reverse buffered on the mobile communications device, and making the selection for request based on the content that is reverse buffered on the mobile communications device. The stored media content may only be stored as reverse buffered media content for a predefined period of time or until the reverse buffer reaches a predetermined capacity, such as a size limit. These limitations can be associated with the reverse buffered media content and stored as metadata of the media content. Additionally, the metadata is communicated with to the catalog to facilitate the catalog in directing appropriate requests to the reverse buffer.

At a step 814, the mobile communications device presents the media content stream an additional time based on the received authorization of step 812. The media content stream is retrieved from the reverse buffer in order to be presented an additional instance on the mobile communications device.

At a step 816, the mobile communications device streams the stored media content stream to a second requesting device. For example, a second requesting device requests from the first mobile communications device for the reverse buffered content to be streamed. Upon receiving the request for to stream the media content, the first mobile communications device identifies the reverse buffered media content requested and begins communicating the media content to the requesting device.

Figure 9:
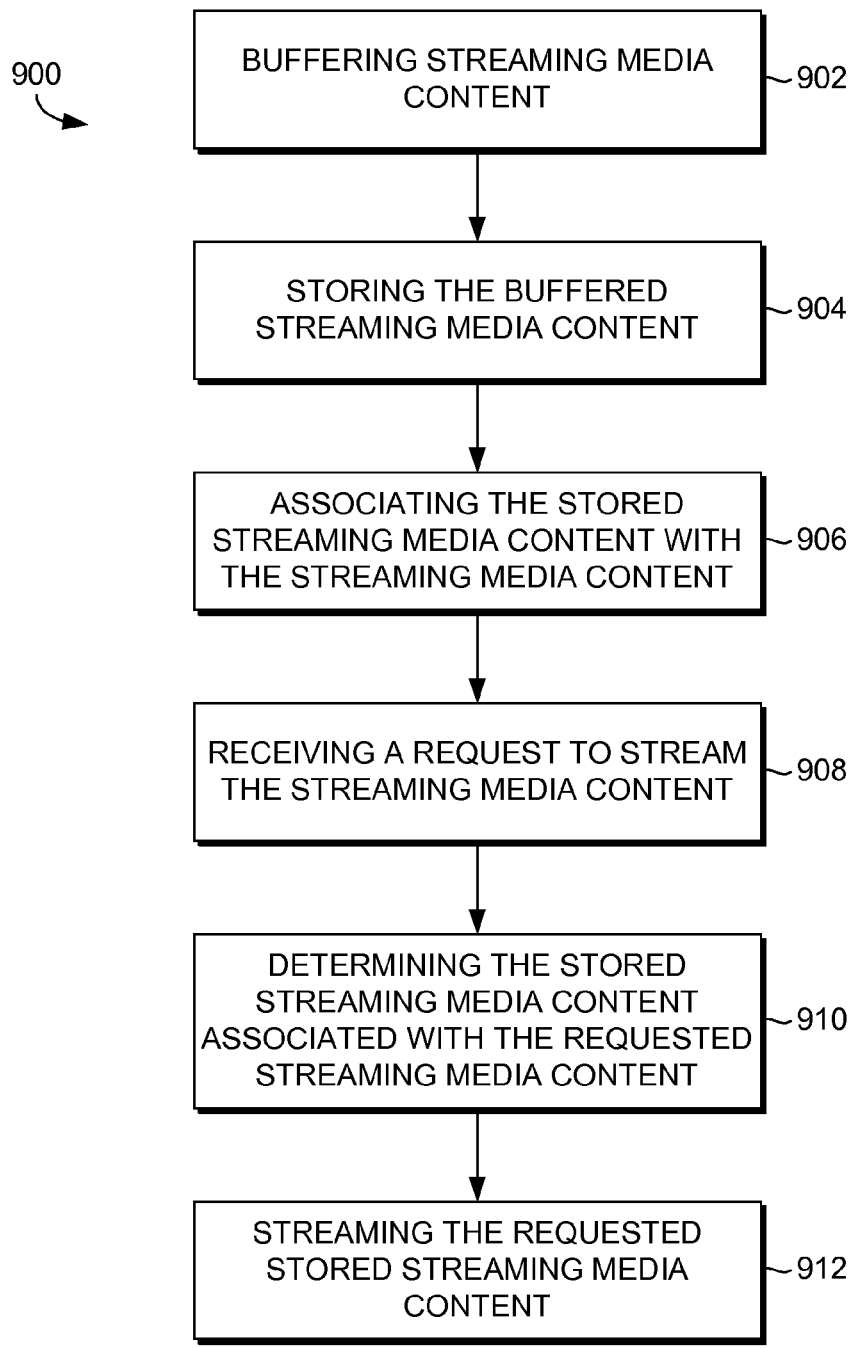
FIG. 9 depicts a method of reverse buffering at least one streaming media content on a mobile communication device that communicates on a wireless telecommunications network in accordance with an embodiment of the present invention.

Turning now to FIG. 9 that depicts an exemplary method of reverse buffering at least one streaming media content on a mobile communications device that communicates on a wireless telecommunications network. The method is generally depicted by the numeral 900.

At a step 902, a mobile communications device buffers streaming media content. The media content is received in response to a request from the mobile communications device. Generally, the media content is received from a host or a reverse buffer of the media content. The difference between the host and the reverse buffer is that the host is one of the original sources identified with requested media content. In an exemplary embodiment, the reverse buffer acts as a proxy type component that stores the media content as a way of achieving greater efficiency in the distribution or communication of the media content.

At a block 904, the mobile communications device stores the buffered media content. Storing of buffered media content is different from merely buffering the media content. When the media content is buffered, the media content is not anticipated to be communicated/streamed to another requesting device at some point in time. Instead, the buffered media content is buffered to facilitate the presentation of the media content at a higher quality than if the media content was not buffered.

At a step 906, a unique identifier of the media content is associated with the reverse buffered media content. The association allows for requests directed towards the media content to be fulfilled by the reverse buffered media content. Therefore, the reverse buffered media content can serve as a substitute of the originally requested media content. The utilization of reverse buffered media content as opposed to the originally requested media content provides for efficiencies in the distribution of the media content. For example, the wireless network of the mobile communications device may have excess bandwidth or more economical bandwidth to communicate the media content as compared to the bandwidth that would be utilized to communicate the media content from a host.

The unique identifier of the media content is an identifier that is utilized to locate or access a particular media content. For example, the unique identifier could include a DNS entry, an IP address, a file name, or other identifiers known to those with ordinary skill in the art. The unique identifier is associated with the stored buffered media content, such as reverse buffered media content, in a catalog that is queried when a request for media content is communicated. The catalog facilitates the identification of reverse buffered media content as a substitute for the originally requested media content.

At a step 908, the mobile communications device receives a request to stream the media content. The request may identify the media content requested to be streamed by the unique identifier of the media content. The request is inspected to identify what media content is requested. At a step 910, a determination is made that identifies what stored media content is associated with the requested media content. For example, a request is received that identifies a content media by a file name. A determination is made as to which of the reverse buffered content media reverse buffered on the mobile communications device is associated with the requested file name. Once that determination has been made, the mobile communications device begins streaming the requested stored media content. The stored media content is streamed to the requesting device. The streaming may be by way of the telecommunications network or by other techniques mentioned previously.

Media content provided by a host can be reverse buffered at a plurality of location. The reverse buffering of the media content is not limited to a number of instances or for a number of times. But, such limitation can be implemented. Additionally, the media content does not have to be reverse buffered in its entirety at one reverse buffer or one component/device. Instead, the media content can instead be partitioned onto a plurality of reverse buffers at a plurality of location on a plurality of component/device in order to be reverse buffered. For example, a video stream that is thirty minutes in length may be partially reverse buffered on a first mobile communications device, while the remaining portions of the video content are reverse buffered at other mobile communications devices. In an exemplary embodiment, reverse buffers associated with a variety of components of a wireless network as well as multiple mobile communications devices that reverse buffer are all utilized to stream a requested media content.

In an exemplary embodiment, a user of a mobile communications device, that includes a reverse buffer that is utilized to reverse buffer media content, is not required to be signed in or registered to provide the content reverse buffered on the mobile communications device. Instead, the mobile communications device includes rules the dictate if the reverse buffered media content is able to be communicated. In an alternative embodiment, the user is compensated, such as lower service fees or other rewards for allowing the mobile communications device to be utilized as a reverse buffer. In an additional exemplary embodiment, the mobile communications device does not have to be receiving media content in order for the reverse buffered media content of the mobile communications device to be streamed to another device. Additionally, the reverse buffer serves as a data store that is closer, from the perspective of the requesting device, than the host of the media content.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer storage media having computer-executable instructions embodied thereon for performing a method of optimizing a unicast stream of media content through a wireless telecommunications network, the method comprising:

receiving, at a base station utilizing a Packet Data Server Node ("PDSN"), a Gateway GPRS Support Node ("GGPRS"), or a Serving GPRS Support Node ("SGPRS") in the wireless telecommunications network, a first request from a first mobile communication device ("first mobile device") for the media content;

querying a catalog to determine whether the requested media content is available as reverse buffered media content, wherein the catalog maintains a registry of media content that is reverse buffered at mobile communication devices;

identifying the media content is not cataloged in a catalog;

when the media content is not available as reverse-buffered media content, then directing the first request to a host of the media content, wherein the host is located in a second network;

receiving the media content, by way of the PDSN, the GGPRS, or the SGPRS in the wireless telecommunications network, from the host;

buffering the media content ("buffered media content") at the base station;

communicating the media content to the first mobile device from the buffered media content;

reverse buffering the media content at the first mobile device as the media content is initially presented on the first mobile device, wherein the reverse-buffered media content is prevented from being presented on the mobile device after the media content stream is initially presented, and wherein the reverse buffered media content is associated with a location identifier that identifies the first mobile device as a location of the reverse-buffered media content;

updating the catalog with information associated with the media content, wherein the information includes the location identifier of the reverse buffered media content;

communicating the media content to the first mobile communication device;

receiving a second request from a second mobile communication device ("second mobile device") for the media content;

determining the media content is cataloged in the catalog;

determining, by querying the catalog, that the media content is reverse buffered;

directing the second request to the reverse buffered media content on the first mobile device, wherein the location identifier facilitates the directing; and communicating, from the first mobile device, the reverse buffered media content to the second mobile device.

2. The media of claim 1, wherein the catalog is coupled with one of the following components of the wireless telecommunication network,
A) the PDSN,
B) the GGPRS,
C) the SGPRS,
D) Node B, and
E) Base Station.

3. The media of claim 1, wherein the catalog is coupled with multiple base stations of the wireless telecommunication network.

4. The media of claim 1, wherein the catalog includes a registry of a plurality of unique media content and each member of the plurality of unique media content is associated with a related reverse buffered media content.

5. The media of claim 1, wherein the catalog includes a registry of a plurality of unique media content that are accessible within the wireless telecommunication network.

6. The media of claim 1, wherein the information associated with the media content includes at least one of,
A) time of reverse buffering of the media content,
B) valid period of the reverse buffered media content,
C) location of the reverse buffered media content,
D) coding information of the reverse buffered media content, and
E) resources allocated to the reverse buffered media content.

7. The media of claim 1, wherein directing a request from a requester is performed by way of either,
A) forwarding the request, or
B) communicating with the requester where the request should be directed.

8. One or more non-transitory computer storage media having computer-executable instructions embodied thereon for performing a method of optimizing a stream of media content through a wireless telecommunications network, the method comprising:
communicating, within the wireless telecommunications network, a first request from a first mobile communication device ("first mobile device") for the media content to be streamed to the first mobile device accessible through the wireless telecommunications network, wherein the first request is communicated to a catalog within the wireless telecommunications network to determine if the media content has been reverse buffered at a mobile communication device;
receiving at the first mobile device the media content from a host of the media content, wherein the host of the media content is in a second network different from the wireless telecommunications network;
reverse buffering the media content as reverse buffered media content on the first mobile device, wherein the media content is reverse buffered as a result of the first request from the first mobile device, and wherein the first mobile device is not allowed to present the reverse buffered media content;
presenting the media content on the first mobile device;
receiving at first mobile device a second request from a second mobile communication device ("second mobile device") for the reverse buffered media content, wherein the second request was directed to the first mobile communication device by the catalog as a result of the catalog indicating that the first mobile device includes the reverse buffered media content associated with the media content; and
communicating, through the wireless telecommunications network, at least a portion of the reverse buffered media content stream to the second mobile device from the first mobile device, wherein communicating at least the portion of the reverse buffered media content stream to the second mobile device from the first mobile device occurs while the first mobile device is not allowed to present the reverse buffered media content.

9. The media of claim 8, wherein the catalog is coupled with one of the following component of the wireless telecommunication network,
A) Packet Data Serving Node,
B) Gateway GPRS Support Node,
C) Serving GPRS Support Node,
D) Node B, and
E) Base Station.

10. The media of claim 8, wherein the catalog includes a registry of a plurality of unique media content and each member of the plurality of unique media content is associated with a respective reverse buffered media content.

11. The media of claim 8, wherein the catalog includes information associated with the media content, the information includes at least one of,
A) time of reverse buffering of the media content,
B) valid period of the reverse buffered media content,
C) location of the reverse buffered media content,
D) coding information of the reverse buffered media content, and
E) resources allocated to the reverse buffered media content.

12. The media of claim 8, wherein the catalog includes an association between the media content and a unique identifier of the first mobile communication device, such that the unique identifier allows a request for the media content to be directed to the first mobile communication device.

13. The media of claim 8, wherein the second request includes authorization information such that the first mobile communication device is authorized to communicate the media content.

14. The media of claim 8 further comprising communicating information regarding the available resources of the first mobile communication device.

15. One or more non-transitory computer storage media having computer-executable instructions embodied thereon for performing a method of optimizing a unicast stream of media content through a wireless telecommunications network, the method comprising:
receiving at a catalog a first request from a first mobile communication device ("first mobile device") for the media content;
determining in the catalog that the media content is not available as a reverse buffered media content on a mobile communication device;
directing the first request to a host of the media content, wherein the host is accessible by a second network that is different from the wireless telecommunications network;
associating in the catalog that the media content is associated with a reverse buffered media content, such that the reverse buffered media content is further associated with a location identifier associated with the first mobile communication device where the reverse buffered media content is reverse buffered, wherein the media content is reverse buffered on the first mobile device from buffered media content as a result of the first request from the first mobile device, wherein the media content reverse buffered on the first mobile device is available to be streamed to a second mobile communication device ("second mobile device") but is prevented from being presented on the first mobile device;

receiving at the catalog a second request from the second mobile device for the media content;

determining the media content is available as the reverse buffered media content that is reverse buffered on the first mobile device; and directing the second request for the media content to the reverse media content based on the location identifier associated with the first mobile device.

16. The media of claim 15, wherein the catalog includes information associated with the media content, the information includes at least one of,
A) time of reverse buffering of the media content,
B) valid period of the reverse buffered media content,
C) location of the reverse buffered media content,
D) coding information of the reverse buffered media content, and
E) resources allocated to the reverse buffered media content.

17. The media of claim 15, wherein directing a request from a requester is performed by way of either,
A) forwarding the request, or
B) communicating with the requester where the request should be directed.

18. The media of claim 15, wherein the location identifier includes one of,
A) Domain Name System (DNS),
B) Internet Protocol (IP) address,
C) port identification,
D) Media Access Control (MAC) identification, and
E) Subscriber Identity Module (SIM) Card identification.

* * * * *